United States Patent
Yamamoto

(10) Patent No.: US 7,548,698 B2
(45) Date of Patent: Jun. 16, 2009

(54) LIGHT COMMUNICATION SYSTEM AND ILLUMINATION APPARATUS THEREFOR

(75) Inventor: Kenji Yamamoto, Kanagawa (JP)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 608 days.

(21) Appl. No.: 11/212,980

(22) Filed: Aug. 26, 2005

(65) Prior Publication Data

US 2006/0044652 A1    Mar. 2, 2006

(30) Foreign Application Priority Data

Sep. 1, 2004    (JP) .............................. 2004-253936

(51) Int. Cl.
*H04B 10/00* (2006.01)
(52) U.S. Cl. .................. 398/172; 398/127; 398/130
(58) Field of Classification Search ................ 398/127, 398/128, 130, 172
See application file for complete search history.

(56) References Cited

U.S. PATENT DOCUMENTS

| | | | | |
|---|---|---|---|---|
| 5,657,145 A | * | 8/1997 | Smith ........................... | 398/172 |
| 5,838,116 A | * | 11/1998 | Katyl et al. ................... | 315/307 |
| 6,548,967 B1 | * | 4/2003 | Dowling et al. .............. | 315/318 |
| 2003/0043972 A1 | | 3/2003 | Burnham et al. ............ | 379/56.3 |

FOREIGN PATENT DOCUMENTS

| | | |
|---|---|---|
| JP | 60227531 | 11/1985 |
| JP | 62-193328 A | 8/1987 |
| JP | 01-264420 A | 10/1989 |
| JP | 01-292918 A | 11/1989 |
| JP | 06-195553 A | 7/1994 |
| JP | 07/095157 | 4/1995 |
| JP | 11127170 | 5/1999 |
| JP | 11-163795 A | 6/1999 |
| JP | 11163795 | 6/1999 |
| JP | 11163795 A * | 6/1999 |
| JP | 2000-209156 A | 7/2000 |
| JP | 2004/72365 | 3/2004 |
| JP | 2004-147063 A | 5/2004 |
| WO | WO200225842 A2 | 3/2002 |

OTHER PUBLICATIONS

Matsushita, H., English-language machine translation of JP 11-163795 A, originally published Jun. 18, 1999.*
Komine et al. *"Integrated System of White Led Visible-Light Communication and Power-Line Communication"*, New York, Feb. 1, 2003, pp. 71-79.

* cited by examiner

*Primary Examiner*—Christina Y Leung

(57) ABSTRACT

An illumination apparatus is used in the light communication system. The apparatus receives electricity from a commercial alternating-current power source and a light-emitting element in the apparatus emits light. The zero passage time of commercial alternating-current power source is detected and signals are transmitted from illumination apparatus, or inter-communications between terminals of communication equipment take place, during a specific reserved time that is in synchronization with this zero passage time.

10 Claims, 3 Drawing Sheets

LIGHT COMMUNICATION SYSTEM AND ILLUMINATION APPARATUS THEREFOR

FIELD OF THE INVENTION

The present invention pertains to a light communication system, particularly a light communication system that uses an illumination apparatus for emission of visible light, as well as an illumination apparatus therefor.

DISCUSSION OF THE BACKGROUND ART

Communication means are well known wherein infrared light or visible light is used and space serves as the signal transmission medium (see JP (Kokai) [Unexamined Japanese Patent Publication] 1[1989]-264,420). Such communication means have an advantage in that cables, fibers, and other types of wiring are not needed and this means can respond flexibly to changes in configuration, and the like. Communications in one or both directions is possible with a system whereby light emitted from a light-emitting side is received at a light-receiving side. A laser, a light-emitting diode, or another type of semiconductor device can be used as the light source.

On the other hand, studies are being performed on communications equipment that uses fluorescent lamps, light-emitting diodes, and other illumination apparatuses for indoor lighting (see, for example, JP (Kokai) [Unexamined Japanese Patent Publication] 1[1989]-292,918; JP (Kokai) [Unexamined Japanese Patent Publication] 11[1999]-163, 795; JP (Kokai) [Unexamined Japanese Patent Publication] 2000-209,156; and JP (Kokai) [Unexamined Japanese Patent Publication] 2004-147,063). By means of this technology, it is possible to communicate with each terminal inside a room using a communication means in juxtaposition with an illumination apparatus.

Studies have been conducted in the field of light communication technology on reducing the effect of illumination light on communications using the periodicity of light emission, and the like. (See, for example, JP (Kokai) [Unexamined Japanese Patent Publication] 1[1989]-264,420; JP (Kokai) [Unexamined Japanese Patent Publication] 1[1989]-292,918; JP (Kokai) [Unexamined Japanese Patent Publication] 11[1999]-163,795) However, in the case of communications using visible light, even in places with relatively low illumination intensity, interference between the illumination light and communication light occurs, and high-reliability communication is not possible. For instance, communication using infrared light is possible in a location where the illumination intensity has temporarily decreased, but this is not possible in the case of visible light communications. Moreover, a further reduction in noise is needed in the case of infrared communication between terminals.

This problem becomes particularly important when two-way communication is necessary. Problems will rarely occur when lighting equipment is used for light communications and modulated light waves are emitted from lighting equipment in one direction (transmission of regional data or release of data specifying a location, or another application) as long as the lighting equipment continuously emits light. However, light power generated by the lighting equipment interferes with communications when there is a communication device at the same place and communication occurs between this device and the lighting equipment or the other communication device.

Furthermore, the illumination apparatus used as the light communication means must maintain both a communication function and an illumination function. That is, when this illumination apparatus is on, the apparatus must maintain optimal luminosity whether the communication function is on or off. The illumination apparatus usually receives electrical power from an alternating-current power source.

Therefore, an object of the present invention is to realize with a relatively a simply configured light communication system and an illumination apparatus therefor, with which high-reliability information exchange is possible by light communication between an illumination apparatus and a terminal, or light intercommunication between terminals.

SUMMARY OF THE INVENTION

The light communication system of the present invention makes possible two-way communication between an illumination apparatus and a terminal, as well as intercommunication between communication terminals, by comprising an illumination apparatus and terminals and setting the period for which the illumination apparatus is not lighted ("reserved time" hereinafter). Reserved time is generated in synchronization with the voltage waveform of a commercial power source; therefore, synchronized reserved time can be generated between multiple units of lighting equipment. Consequently, when all illumination apparatuses in a certain room are turned off by reserved time, the light level inside the room can be kept low for the reserved time; therefore, light communication by visible or another type of light is facilitated. Moreover, when the lighting equipment has a light communication function, visible light or infrared communications can be realized between units of lighting equipment, or between the lighting equipment and personal computers, during this reserved time.

That is, the light communication system of the present invention comprises communication terminals and a lighting apparatus that emits light supplied by an alternating-current power source; the lighting apparatus provides a reserved time available exclusively for signal transmission at a specific period that is in synchronization with the zero passage time of the voltage of the alternating-current power source; and the illumination apparatus is turned off in terms of emission of light for signal transmission during this reserved time. The communication terminals perform signal transmission and reception during the reserved time set to the illumination apparatus. The length of the reserved time is variable.

In this case, it is possible to change the signal transmission and reception times at the communication terminals in accordance with the reserved time setting of the illumination apparatus. The user can access the communication terminals and set the signal transmission and reception times in accordance with the reserved time setting of the illumination apparatus, or the communication terminals can also automatically detect and set or switch to different reserved times.

The reserved time can start at the zero passage time. It is preferred that the reserved time be no greater than $\frac{1}{20}^{th}$ of the interval of the zero passage time in order to maintain the lighting function.

The illumination apparatus can also be such that it comprises multiple illumination apparatuses set at a common reserved time within a predetermined space. Moreover, the illumination apparatus comprises communication means for visible-light communications with communication terminals. By means of one example, identification information for the terminal and other communication setting information can be transmitted within a first specific period of the reserved time.

Furthermore, by means of the present invention, an illumination apparatus comprising illumination means for the emission of light from an alternating-current power source to be used in light communications is made such that the reserved time available for light communication signal transmission is set at a specific period that is in synchronization with the zero passage time of the voltage of the alternating-current power source and the illumination is turned off during the reserved time.

The communication device has light-emitting elements for illumination and light-emitting elements for communication. The two types can be separate elements or they can be common elements. Both types of light-emitting elements are typically made from light-emitting diodes. At least some of the light-emitting elements employed for illumination can be adjusted to a different emission spectrum than the light-emitting elements for communication. The light-emitting elements for communication can further comprise multiple light-emitting elements for the emission of light of different wavelengths. The light-emitting elements for communications can also be used to transmit transmission settings and other additional information during the reserved time.

By using lighting equipment having the proposed functions, highly reliable light wireless communication becomes possible, whether the space around the communication terminals is illuminated. Infrared communications and the like are used in order to transmit signals from terminals, but the transmission of signals from lighting equipment can also be done with visible light. Local time synchronization becomes possible; therefore, visible-light communication becomes possible with half duplex communication (there is two-way communication, but communication is performed by temporarily switching between signal transmission and signal reception) or time division multiple access (TDMA). As a result, higher performance light wireless communication than in the past is provided.

DETAILED DESCRIPTION OF THE PREFERRED EMBODIMENT

Figure 1:
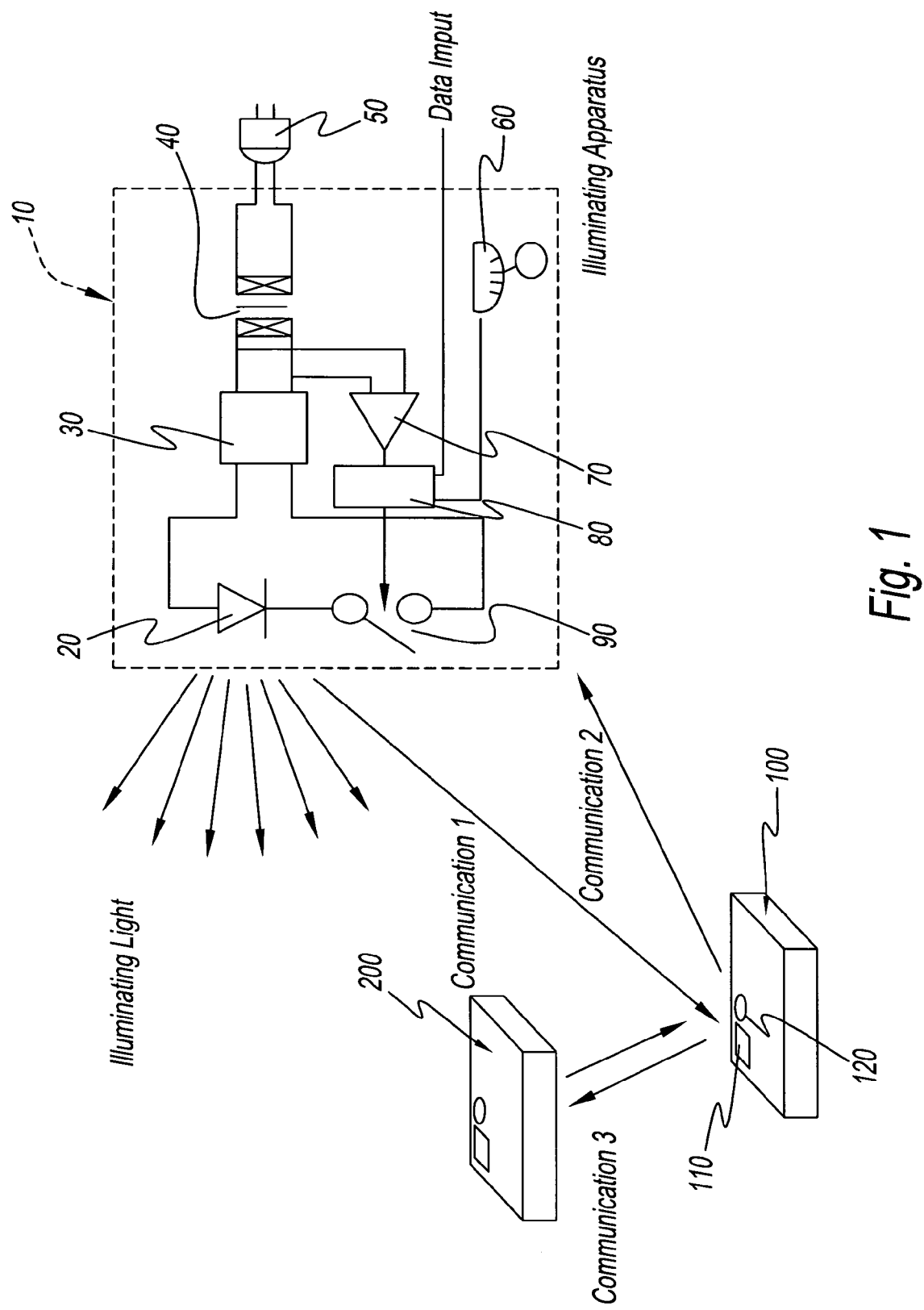
FIG. 1 is an overall drawing showing the structure of the first preferred embodiment of the light communication system of the present invention.
Figure 2:
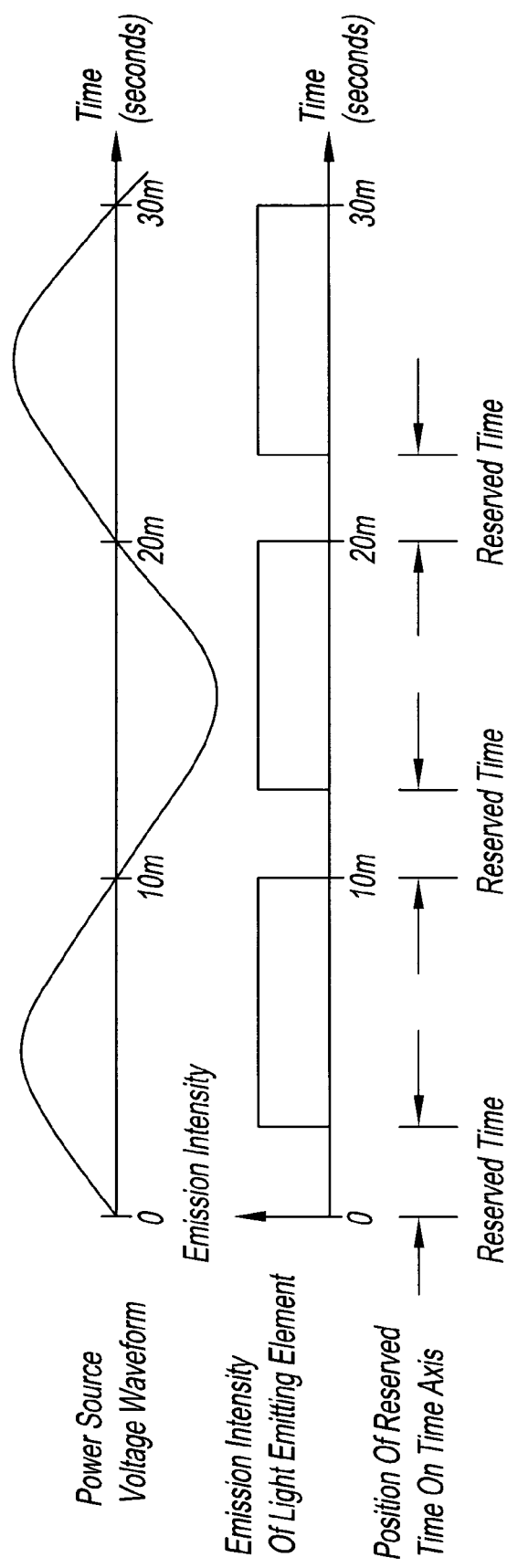
FIG. 2 is a time chart showing the operation of the illumination apparatus of the first preferred embodiment of the light communication system of the present invention.

Preferred embodiments of the light communication system and the illumination apparatus therefor of the present invention will now be described in detail while referring to the attached drawings. FIG. 1 is a general diagram representing the first preferred embodiment of the light communication system of the present invention. Moreover, FIG. 2 is a time chart showing the operation of the illumination apparatus used in the present embodiment.

According to FIG. 1, the system comprises an illumination apparatus 110 and information terminals 100 and 200. Illumination apparatus 10 also functions as a communication device capable of communicating at least by visible light. For instance, illumination apparatus 10 is fastened to the ceiling of a specific room to be lighted. There are two terminals 100 and 200 in the drawing, but there can also be one terminal or three or more terminals. FIG. 1 shows the state where only terminal 100 communicates with illumination apparatus 10, but two or more terminals can communicate with a shared illumination apparatus 10.

Illumination apparatus 10 comprises a light-emitting element 20 for illumination, a power source circuit 30 for supplying the necessary power to light-emitting element 20, and a switching element 90 for on/off control of the light emission from light-emitting element 20. Switching element 90 is controlled by a timing circuit 80. As described later, light-emitting element 20 is used for illumination and for data transmission or transmission of signals that include additional information. Light-emitting element 20 can be an element that emits white light or elements that emit light of different wavelengths such that the wavelengths are mixed together to create white light.

Electricity is supplied from commercial power source 50 to power source circuit 30. Commercial power source 50 is shown in the figure as a domestic power plug, but in-wall wiring and various other means can also be used. Moreover, a transformer 40 is disposed between commercial power source 50 and the power circuit 30 as needed.

A zero passage detection circuit 70 and data input are connected at timing circuit 80. Zero passage detection circuit 70 detects the position on the time axis of the zero passage of the alternating current supplied from commercial power source 50 and provides this information to timing circuit 80. The timing circuit sets a specific reserved time that is synchronized with this zero passage time. Switching element 90 is open and light-emitting element 20 is off during the reserved time.

By means of the present example, data are input through separate input terminals to commercial power source 50. There are a variety of methods for providing the data to illumination apparatus 10, and such methods are not limited to electrical methods. Light fibers can also be used. In other cases, data can be sent via the wiring of a power source, extracted through a transformer, and transmitted to the timing circuit.

An example of the mode of operation of timing circuit 80 is shown in FIG. 2. The commercial power source in this example is a 50 Hz alternating-current power source. As illustrated, the reserved time is set within a specific period and is immediately after the zero passage time in the present example. When there are no signals transmitted during the reserved time, light-emitting elements 20 are off. By way of convenience, the figure represents a relatively long reserved time, but the reserved time intended to guarantee sufficient luminosity is preferably no greater than $1/20^{th}$ of the period of the zero passage time. Furthermore, this reserved time does not necessarily begin at the zero passage time and can start after a specific lag time that is in synchronization with the zero passage time.

During the reserved time, light-emitting element 20 can be brought to an ON state for data communication only. The light-emitting element for communication and the light-emitting element for illumination can be separate elements, but the same element can serve as both as in the present embodiment. There are no data transmission signals in FIG. 2; therefore, the on/off state of the light emitting element for transmission is not represented.

As shown in FIG. 1, signals transmitted from illumination apparatus 10 during this reserved time are then sent through a space and received at terminal 100 (communication 1). Photodiodes or other light-receiving elements 110 are disposed on terminal 100 in order to receive these signals. Moreover, although not illustrated, signals can also be transmitted from terminal 100 to illumination apparatus 10 during the reserved time as long as illumination apparatus 10 has a reception means (communication 2). Intercommunications between terminal 100 and terminal 200 is also possible (communication 3). A light-emitting element 120 for making possible the transmission of light signals of visible light or infrared light are disposed on terminal 100.

Illumination apparatus 10 comprises a reserved time setting switch 60 for switching the length of the reserved time. It is possible to set the reserved time at each setting of multiple alternative times, for instance, 0 seconds, 50 µs, 100 µs, and 300 µs, by turning the switch. On the other hand, the user of terminal 100 can set the transmission and reception periods of the signals at the terminal in accordance with the reserved time setting for illumination apparatus 10. In another case, terminal 100 can automatically detect the reserved time from information based on modulated waves, and the like, as discussed below, and set the transition and reception periods of the signals.

Furthermore, illumination apparatus 10 can have a remote-control function such that the reserved time can be set by a remote control device. When there are multiple illumination apparatuses 10 within a specific space, it is preferred that they be able to share terminals for the remote control means.

Figure 3:
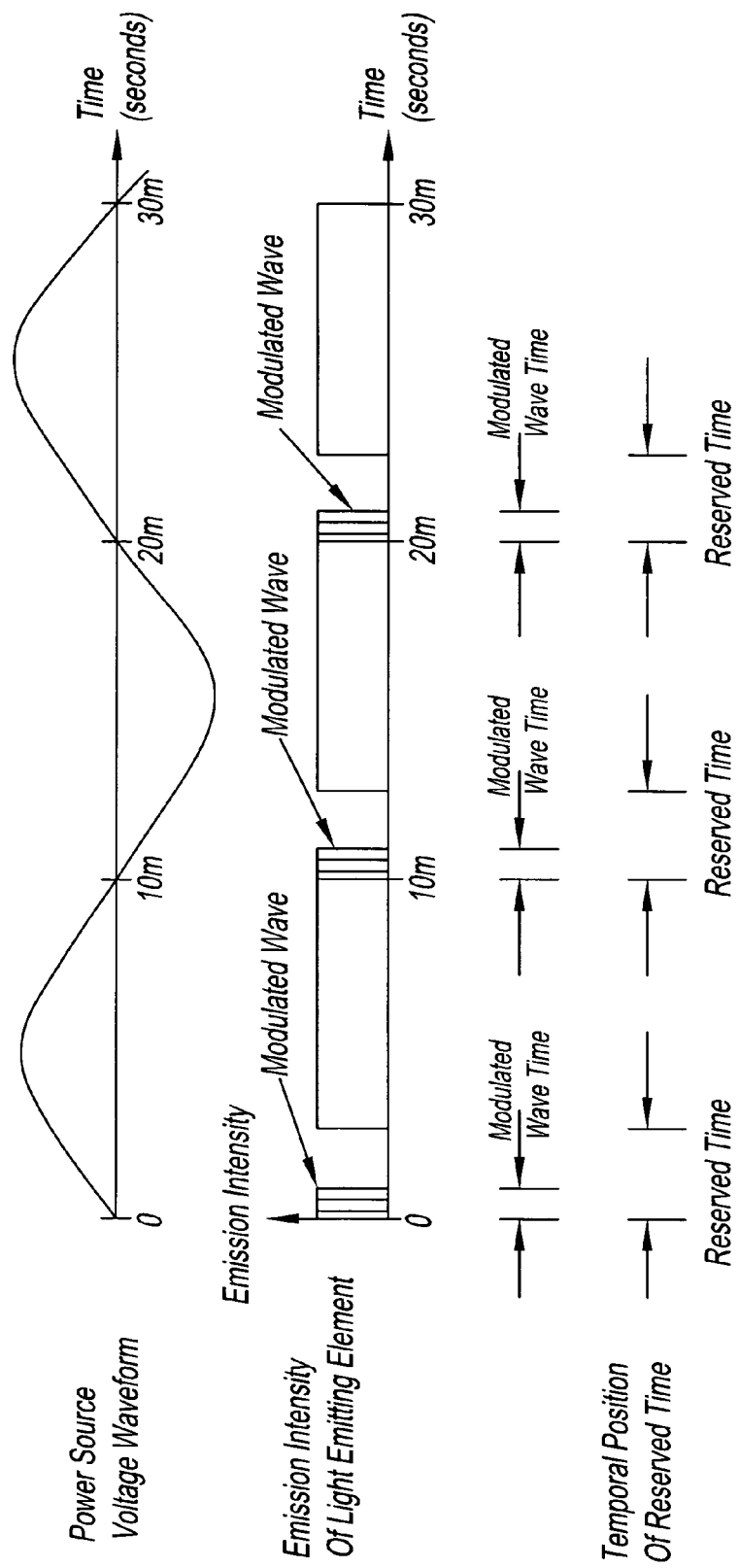
FIG. 3 is a time chart showing the operation of the illumination apparatus of the second preferred embodiment of the light communication system of the present invention.

FIG. 3 is a time chart for showing the operation of a second preferred embodiment of the illumination apparatus of the present invention. This embodiment is a modified example of the first preferred embodiment and is an example of transmission of modulated waves within the reserved time. For instance, the light-emitting elements emit light of an intensity that is in proportion to modulated waves.

The modulated waves include, for instance, the identification information of a terminal that is the subject of communication. That is, when multiple terminals are disposed within a space that is illuminated by an illumination apparatus, each of the terminals receives signals from the illumination apparatus within the reserved time, but only terminals included in the identification information participate in the communication.

An example of providing terminal identification information to modulated waves is a network of multiple rooms rather than a single room as the communication space. In this case, a network is constructed by means of illumination apparatuses in different rooms. Identification information of a predetermined terminal is provided through illumination apparatuses disposed in each of the rooms such that only a predetermined terminal corresponding to the identification information can participate in the communication. In this case, the duration of the reserved time or the position of the reserved time for each room does not need to be a common time and the time can be of different lengths.

As shown in FIG. 3, the modulated waves that provide terminal identification information account for the first half of the reserved time. The same modulated waves can be transmitted during a series of signals in order to identify the same terminal, or different modulated waves can be transmitted in order to select different terminals.

Examples of other information that can be transmitted by modulated waves include (1) information of reserved time generated by (all) lighting tools inside a room, (2) information that specifies a place, such as the address of a room, room number, and the like, (3) a local area network (LAN) set up through lighting tools comprising light-receiving devices, and (4) detection of zero passage time. By means of (4), the communication equipment under the illumination apparatus can know precisely the start time of the reserved time (zero passage time of the power source voltage waveform) by following over time the period of the modulated waves using a PLL circuit and the like. In particular, if only (4) is used, it is possible to employ a simple repeating waveform and a waveform that has been modulated by pseudo-random number access, and the like.

The above-mentioned has been a detailed description of preferred embodiments of the light communication apparatus of the present invention and a light communication system that uses the same, but these are only examples and various changes and modifications are possible by persons skilled in the art. For instance, the illumination apparatus itself is not necessarily equipped with the communication device.

What is claimed is:

1. A light communication system, comprising:
a communication terminal; and
an illumination apparatus with which light is emitted by an alternating-current power source, wherein
said illumination apparatus provides reserved time available exclusively for light communication signal transmission of a specific period that is in synchronization with the zero passage time of the voltage of the alternating-current power source, and
light emission of the illumination apparatus is turned off during this reserved time, and said communication terminal communicates signals in accordance with a light communication signal transmission time and a light communication signal reception time in accordance with the reserved time of the illumination apparatus, the signals comprising modulated waves, wherein the length of the reserved time of said illumination apparatus can be varied, and said light communication signal transmission time and said light communication signal reception time can be changed in accordance with the reserved time setting of said illumination apparatus.

2. The system according to claim 1, wherein said illumination apparatus comprises multiple illumination apparatuses set at a common reserved time within a predetermined space.

3. The system according to claim 1, wherein said reserved time starts at the zero passage time.

4. The system according to claim 1, wherein said reserved time is no greater than $\frac{1}{20}^{th}$ of the interval of the zero passage time.

5. The system according to claim 1, wherein said illumination apparatus comprises a signal detector for mutual visible light communication with said communication terminal.

6. The system according to claim 1, wherein said illumination apparatus comprises a light-emitting element for illumination and a light-emitting element for communication.

7. The system according to claim 6, wherein data signals for communication settings are transmitted during the reserved time using the light-emitting element for communication.

8. The system according to claim 1, wherein a common element is used to emit illuminating light during time other than said reserved time and emit a light communication signal during said reserved time.

9. The system of claim 1, wherein the illumination apparatus comprises a switch for configuring the duration of the reserved time.

10. The system of claim 9, wherein the switch sets the reserved time to one of multiple alternative reserved times.

* * * * *